| United States Patent [19] | [11] | Patent Number: | 4,791,166 |
|---|---|---|---|
| Saukaitis | [45] | Date of Patent: | Dec. 13, 1988 |

[54] FLUOROCARBON POLYMER COMPOSITIONS AND METHODS

[75] Inventor: John C. Saukaitis, East Greenwich, R.I.

[73] Assignee: Hoechst Celanese Corporation, Somerville, N.J.

[21] Appl. No.: 172,066

[22] Filed: Mar. 23, 1988

[51] Int. Cl.$^4$ .......................... C08L 27/12; C08F 12/30
[52] U.S. Cl. ...................................... 524/544; 526/243
[58] Field of Search ................ 526/245, 243; 524/490, 524/544

[56] References Cited

U.S. PATENT DOCUMENTS

| 3,470,124 | 9/1969 | Eygen et al. | 526/245 |
| 3,491,169 | 1/1970 | Raynolds et al. | 526/245 |
| 4,522,973 | 6/1985 | Ley et al. | 526/304 |
| 4,564,561 | 1/1986 | Lore et al. | 428/422 |

FOREIGN PATENT DOCUMENTS 0198252 10/1986 European Pat. Off. .

*Primary Examiner*—Joseph L. Schofer
*Assistant Examiner*—N. Sarofim
*Attorney, Agent, or Firm*—Perman & Green

[57] ABSTRACT

Resin compositions, soluble in odorless mineral spirits, and dryable at room temperature after application to textiles, leather, wood or other surfaces to form soil-oil and water-repellent coatings. The resin compositions are terpolymers comprising a fluoroaliphatic vinyl monomer, a hydrocarbyl higher alkyl vinyl monomer and a polyfunctional vinyl monomer selected from the group consisting of (a) a vinyl amido glycolate ether monomer; (b) a monomeric vinyl diketo ester monomer and (c) a vinyl ester monomer containing hydroxy and halide groups.

9 Claims, No Drawings

FLUOROCARBON POLYMER COMPOSITIONS AND METHODS

BACKGROUND OF THE INVENTION

The present invention relates to novel resinous compositions which are soluble in odorless, halogen-free volatile solvents, such as odorless mineral spirits, to provide solutions which can be sprayed, painted, spread or otherwise coated onto a variety of materials such as textiles, leather, wood or other surfaces and air-dried at room temperatures to form oil-and water-repellent coatings.

It is known to coat a variety of materials with resinous compositions which dry at room temperatures to impart oil-and water-repellent properties. Oleophobic polymeric fluorinated compositions are known to be particularly effective for this purpose. Such compositions contain highly fluorinated aliphatic groups in sufficient amounts to give a high percentage of fluorine in the composition, of the order of 30 to 50 percent fluorine in many cases. Such a high fluorine content tends to make the polymeric compositions substantially insoluble in most organic solvents so that coating from solution in most readily available inexpensive non-halogenated solvents, and most particularly from odorless mineral spirits, is not possible. Coating from emulsions or latices in water is required. This increases the drying time and introduces water which can be harmful to the material or surface being treated.

Reference is made to U.S. Pat. Nos. 3,950,298 and 4,564,561 for their disclosure of fluorinated acrylic and methacrylic acid esters, polymeric compositions and their use for treating materials to impart oil-and water-repellent properties. The former patent discloses terpolymer solutions in methyl isobutyl ketone.

Aside from the insolubility of useful amounts of known fluorinated polymeric compositions in most inexpensive non-halogenated volatile organic solvents in useful amounts, and most particularly in odorless mineral spirits, i.e., from about 1% to 2% or more, such known compositions generally produce unsatisfactory repellency results on a wide variety of materials.

Known fluorocarbon polymer compositions generally provide an oil repellency of less than 4 on most textiles, leather and wood, and an unsatisfactory aqueous stain repellency particularly in the case of certain textile fabrics and leather in general.

SUMMARY OF THE INVENTION

The present invention is based upon the discovery of certain fluorocarbon terpolymers containing three essential polymerizable monomers, the amounts of which can be varied within limits in order to regulate the oil-resistance and solubility thereof in halogen-free, odorless organic solvents. Such resinous terpolymer compositions are soluble in useful amounts in such solvents and can be sprayed or otherwise coated onto fabrics, leather, wood or other materials and dried at ordinary room temperatures within a relatively short period of time to provide coatings having exceptional oil-and water-repellent properties.

The novel terpolymers of the present invention comprise polymers prepared by the reaction of three different monomers namely (1) a fluroaliphatic vinyl monomer, (2) a higher aliphatic hydrocarbyl vinyl monomer and (3) a polyfunctional vinyl monomer cross-linking agent selected from the group consisting of (a) a vinyl amido glycolate ether monomer; (b) a monomeric vinyl diketo ester monomer and (c) a vinyl ester monomer containing hydroxy and halide groups, and preferably:

1. 20 to 60 percent of fluoroaliphatic vinyl monomer, e.g., perfluoralkylethyl acrylate or methacrylate, N-alkyl heptadecafluoroctanesulfonimidoethyl acrylate or methacrylate;
2. 25 to 60 percent hydrocarbyl higher (e.g., $C_8$ to $C_{20}$) alkyl vinyl monomer, e.g., stearyl-methacrylate, or the like, and any one of the following:

3(a). 10 to 25 percent of a (meth)acrylamide glycolate ether, or

3(b). 10 to 25 percent of a (meth)acrylic acid ester of an aceto acetoxy alkyl alcohol, or 3(c). 10 to 25 percent of a (meth)acrylic acid ester of a halogenated diol Monomer (1) of the present compositions must contain a fluoroaliphatic radical terminating in a $CF_3$ group. The fluoroaliphatic radical should contain at least six fully fluorinated carbon atoms which contain the terminal $CF_3$. A prefluoroalkyl group, $C_nF_{2n+1}$, is preferred wherein n is 6 to 12. The monomer should contain at least 25 percent by weight of fluorine in the form of fluoroaliphatic radical and generally about 50–68 percent. The fluoroaliphatic-radical containing monomer provides oil repellency in air.

The fluoroaliphatic radical is a fluorinated, saturated, monovalent, non-aromatic, straight chain aliphatic radical of at least 6 carbon atoms. Hydrogen atoms may be present as substituents in the fluorinated aliphatic radical provided that not more than one atom of hydrogen is present in the radical for every two carbon atoms, and that the radical must at least contain a terminal perfluoromethyl group. "Terminal" in this connection refers to the position in the skeletal chain of the radical which is furthest removed from the backbone chain of the segment. Preferably the fluoroaliphatic radical contains not more than 16 carbon atoms because such a large radical results in inefficient use of the fluorine content.

More particularly, suitable fluoroaliphatic radical-containing (meth)acrylate monomers include those listed in Appendix I and in Appendix II.

| | APPENDIX I |
|---|---|
| (1) | $R_fCH_2CH_2O_2CCHCH_2$ |
| (2) | $C_8F_{17}CH_2CH_2O_2CCHCH_2$ |
| (3) | $R_fCH_2CH_2O_2CCCH_3CH_2$ |
| (4) | $C_8F_{17}CH_2CH_2O_2CCCH_3CH_2$ |
| (5) | $C_8F_{17}SO_2N(C_2H_5)C_2H_4O_2CCHCH_2$ |
| (6) | $C_8F_{17}SO_2N(C_2H_5)C_2H_4O_2CCCH_3CH_2$ |
| | $R_f = C_6F_{13}$ to $C_{12}F_{25}$ |

| APPENDIX II | | |
|---|---|---|
| Inventors | U.S. Pat. No. | Title |
| Reid & Husted | 2,642,416 | Fluorinated Acrylates & Polymers |
| Ahlbrecht, Brown & Smith | 2,803,615 | Fluorocarbon Acrylate & Methacrylate Esters & Polymers |
| Bovey & Abere | 2,826,564 | Fluorinated Acrylate & Polymers |
| Ahlbrecht & Smith | 3,102,103 | Perfluoroalkyl Acrylate Polymers & Process of Producing a Latex Thereof |
| Johnson & Raynolds | 3,256,230 | Polymeric Water & Oil Repellents |

APPENDIX II -continued

| Inventors | U.S. Pat. No. | Title |
|---|---|---|
| Johnson & Raynolds | 3,256,231 | Polymeric Water & Oil Repellents |
| Fasnick & Raynolds | 3,282,905 | Fluorine Containing Esters & Polymers Thereof |
| Smith & Sherman | 3,329,661 | Compositions and Treated Articles Thereof |
| Smith & Sherman | 3,356,628 | Copolymers of Perfluoro Acrylate Hydroxy Alkyl Acrylates |
| Farah & Gilbert | 3,407,183 | Acrylate & Methacrylate Esters and Polymers Thereof |
| Kleiner | 3,412,179 | Polmers of Acrylyl Perfluorohydroxamates |
| Pacini | 3,445,491 | Perfluoroalkylamido-alkylthio Methacrylates and Acrylates & Intermediates Therefor |
| Eygen & Carpentier | 3,470,124 | New Fluorinated Compounds & Their Preparation |
| Brace | 3,544,537 | Poly(perfluoroalkyoxy)-poly-fluoroalkylacrylate-Type Esters & Their Polymers |
| Caporiccio & Strepparola | 3,814,741 | Acrylic and Methacrylic Monomers, Polymers & Copolymers |

The second component, or monomer (2) in the polymers of the invention is a higher aliphatic hydrocarbyl vinyl monomer, preferably a higher alkyl acrylate or methacrylate, $C_mH_{2m+1}O_2CC(X)=CH_2$ where m is 8 to 20 and X is H or $CH_3$, used in an amount of 25-60% by weight of the monomer mixture. A particularly convenient component is found to be commercially available stearyl methacrylate in which the stearyl group is a mixture of higher alkyl groups in which $C_{18}H_{37}$ predominates. Examples of suitable monomers are n-hexylacrylate, 2 ethylhexyl acrylate, isooctyl acrylate, decyl acrylate, isodecyl acrylate, isobornyl acrylate, undecyl acrylate, lauryl acrylate, duodecyl acrylate, tridecyl acrylate tetradecylacrylate, penta-decyl acrylate, hexadecyl acrylate, and stearyl acrylate as well as the corresponding methacrylates. Styrene, methylstyrene and styrene acetate can also be utilized in mixture with the above mentioned monomers.

(3a). The third component needed for the polymer of the invention may be 3(a) a monomeric vinyl amido glycolate ether compound of the class defined by the general formula:

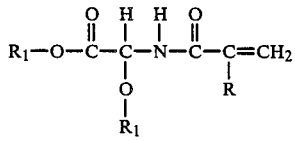

wherein R is H or $CH_3$ and $R_1$ is a similar or different lower alkyl group having from 1 to 4 carbon atoms, most preferably $CH_3$. A preferred monomer of formula 3(a) is methacrylamidoglycolate methyl ether, which is commercially-available from American Cynamid Company.

The terms (meth)acrylate, (meth)acrylamide and (meth)acrylic acid are used herein as generic terms to embrace both the specific acrylic and specific methacrylic ester, amide and acid. While the disclosure and Examples herein specifically refer to the acrylic or methacrylic compounds, nevertheless, applicants intend to cover the use of other homologous unsaturated esters and amides and acids under the doctrine of equivalents.

These polymers show surprisingly good oil and water repellency when applied from a solvent, e.g., odorless mineral spirits to a variety of surfaces (e.g. wood, leather, textiles, metal, plastic, ceramics and glass, etc.) and air dried at room temperature for 6-48 hours.

Alternatively, the third component needed for the polymer of the invention may be 3(b) a monomeric vinyl diketo ester compound of the class defined by the general formula:

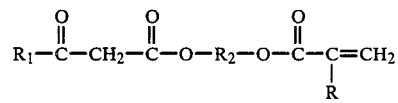

wherein R represents the unsaturated hydrocarbon residue of a monocarboxylic unsaturated acid, e.g., acrylic or methacrylic, and $R_2$ represents an alkylene group having 1 to 4, preferably 2 carbon atoms, and $R_1$ is an alkyl group having 1 to 4 carbon atoms, preferably 1. The monomers of formula 3(b) may be prepared by reacting a hydroxyalkyl(meth)acrylate with a diketene. A preferred monomer 3(b) is aceto acetoxy ethyl(meth)acrylate. These polymers show surprisingly good oil and water repellency when applied from a solvent, e.g. odorless mineral spirits to a variety of surfaces (e.g. wood, leather, textiles, metal, plastic, ceramics and glass, etc.) and air dried at room temperature for 6-48 hours.

A final alternative for the third component 3(c) is a monomeric vinyl ester compound having the formula:

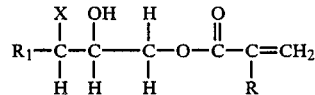

wherein $R_1$ is hydrogen or a lower alkyl group having 1 to 4 carbon atoms, preferably hydrogen, X is a halogen atom, preferably chlorine, and R is H or $CH_3$. A preferred formula 3(c) monomer is 3-chloro-2-hydroxy propyl(meth)acrylate.

The polymers of the invention are obtained by standard polymerization procedures. Solvent polymerization has been found most useful. Most conventional solvents are useful, with methyl ethyl ketone, methyl isobutyl ketone and 1,1,2-Trichloro-tri-fluoroethane being preferred.

Total polymer solids as high as 50 percent or more can be obtained in the reaction mixture but solids contents of 36-45 percent are usually of more suitable viscosity.

The weight ratio of component 1 to component 2 can vary over a broad range and will be selected to provide the desired balance of oil and water resistance on the substrate to be treated while preferably maintaining at least a 1-2% solubility in odorless mineral spirits. In general, as the amount of component 1 is increased, oil resistance increases and as the amount of component 2 is increased, the solubility in mineral spirit increases. Component 3 is essential to the composition as a polyfunctional cross-linking agent which preserves the desired solubility of the terpolymer, renders it curable at room temperature after application and drying, and increases the oil repellency imparted.

As the amount of component 3 increases so does the oil repellency after evaporation of the solvent at room temperature. At levels of 10-20%, the oil repellency is obtained in 6-48 hours, upon evaporation of the solvent. A two component composition of 1 and 2 alone, give oil repellency values from 1-4 whereas compositions containing 1, 2 and 3 in general give values of 4 or better on most upholstery samples, 4 or better being desirable.

The product terpolymer, in the form of a solution of from at least about 0.5% by weight and up to the maximum solubility limit, i.e., about 5% by weight, in odorless mineral spirits, can be applied to materials such as fabrics by conventional means, such as spraying, padding, brushing or roll-coating, to provide a treated fabric which, after drying at room temperature has resistance to oily or aqueous stains.

The fluorochemical compositions of this invention can be applied to articles such as textile fabrics, nonwoven webs, single fibers, carpets, and the like made of natural materials such as wool, cotton, cellulose, wood and leather or of synthetic materials such as nylon, acrylics and olefins.

They can also contain adjuvants. It will be frequently desirable to add UV absorbers to increase the polymers' resistance to sun light. Mildewcides and fungicides are desirable additives for application on wool; biocides and antistats are desirable additives for carpet and upholstery.

Most known organic solvent-soluble fluoropolymers have solubility in freon TF, III-trichloroethane and ketone solvents like methylethyl ketone and methylisobutyl ketone. Odorless mineral spirits is preferred because of cost, lack of offensive odor and freedom from the potential health and safety hazards involved with the use of the other solvents mentioned.

Any conventional free radical catalysts which are soluble in the solvent system can be used. Particularly preferred are azo compounds such as 2,2'-Azobisisobutyronitrile and peroxides such as delauryl peroxide. Catalyst concentration is suitably 0.1 to 1 percent of weight of monomers.

Conventional chain transfer agents, such as duodecylmercaptan, can be used in amounts of 0.1 to 1 percent preferably about 0.15 to 0.6 percent by the weight of monomer to control the molecular weight of the polymer product.

The oil repellency of treated materials is measured by AATCC Standard Test 118-1978, which test is based on the resistance of treated material such as fabric to penetration by oils of varying surface tensions. Treated fabrics resistant only to "Nujol", a brand of mineral oil, and the least penetrating of the test oils, are given a rating of 1, whereas treated fabrics resistant to heptane, the most penetrating of the test oils, are given a value of 8. Other intermediate values are determined by use of other pure oils or mixtures of oils. The rated oil repellency corresponds to the most penetrating oil (or mixture of oils) which does not penetrate or wet the fabric after 30 seconds contact. In some cases, ratings in one-half point increments are assigned where slight wetting of the fabric occurred but no penetration is observed. Higher numbers indicate better oil repellency. In general, an oil repellency of 4 or greater is desirable.

The aqueous stain repellency of treated samples is measured using a water/isopropyl alcohol test, and is expressed in terms of the "WATER/IPA" rating of the treated fabric. Treated fabrics are treated with a mixture of water/isopropanol from 100% water/0% isopropanol to 50% water/50% isopropanol. The water repellency corresponds to the most penetrating mixture which does not penetrate or wet the fabric after 30 seconds contact. A rating of 50/50 is most desirable.

Portions of the solutions of the following Examples were diluted in odorless mineral spirits (OMS) to a concentration of 0.5%-2.0%. This solution is sprayed, brushed or padded, etc. on the substrate being tested. It is sprayed on the upholstery samples and brushed on the leather and wood samples, as identified in Table IV hereof.

Eight 2" square upholstery samples of varying composition are mounted on a 9"×12" cardboard. This piece of cardboard is sprayed with a 1% odorless mineral spirit solution of each fluoro-polymer. The sprayer is a turbomist airless pump sprayer (Century 400, Fountain Valley CA). One pass is made over the samples at a rate of 12"/3 seconds at a distance of 12" from samples. All comparative samples were tested in the same manner. Samples were allowed to air dry at room temperature for various lengths of time with 15 hours being typical. The samples were then tested for oil and water repellency and the test results are given in Table III hereof.

Leather samples were treated by brush application with a 2% odorless mineral spirits solution of fluoropolymer. The leather sample was weighed before and after application to determine wet pick-up. Samples were air dried at room temperature for 15 hours. Testing was the same as for upholstery. Wood application was carried out in the following manner: A 1% OMS solution of fluoropolymer was brushed on a 6"×1"×1/16" piece of white birch board. The sample was allowed to air dry for 15 hours at room temperature and then tested for oil and water repellency with the results given in Table III hereof.

Now, having described the invention broadly, it is more specifically illustrated by examples showing how the invention is practiced and the best mode presently contemplated for practicing the invention. The following examples show solvent polymerization systems and compositions to yield the polymers of the invention, from which those skilled in the art will readily perceive variations by which other equivalent polymers are made within the spirit and scope of the present invention.

EXAMPLE 1

A Parr bottle of about 500 ml capacity is charged with:

| | |
|---|---|
| 10 g | Perfluoroalkylethylacrylate (1A) (commercially available from Hoechst/Celanese) |
| 7 g | Stearyl methacrylate (2A) (commercially available from Rohm & Haas) |
| 3 g | Methylacrylamidoglycolate methyl ether (3A) |
| 0.1 g | 1,1,-azobis(cyclohexanecarbonitrile) |
| 24 g | Methyl ethyl ketone |

The bottle is flushed with oxygen free nitrogen, for 30 seconds, sealed and shaken for 10 hours at a temperature of 105° C. which is maintained by a heating mantle equipped with a temperature controller and temperature probe.

EXAMPLES 2–10, 22 AND 23

The polymers were prepared by a similar procedure as in Example 1 with the proportions and individual monomers given in Tables I and II.

EXAMPLE 11

A Parr bottle of about 500 ml capacity is charged with:

| | |
|---|---|
| 10 g | Perfluoroalkylethylacrylate (1A) (commercially available from Hoechst/Celanese) |
| 7 g | Stearyl methacrylate (2A) (commercially available from Rohm & Haas) |
| 3 g | Acetoacetoxyethyl methacrylate (3B) (commercially available from Eastman Kodak) |
| 0.1 g | Duodecylmercaptan |
| 0.1 g | 1,1'-azobis(cyclohexanecarbonitrile) |
| 36 g | 1,1,2-Trichloro-1,2,2-Trifluoroethane |

The bottle is flushed with oxygen free nitrogen, for 30 seconds, sealed and shaken for 10 hours at a temperature of 105° C. which is maintained by a heating mantle equipped with a temperature controller and temperature probe.

EXAMPLES 12–21 AND 24–26

The polymers were prepared by a similar procedure as in Example 11 with the proportions and individual monomers given in Tables I and II.

COMPARATIVE EXAMPLES 27 AND 28

The polymers were prepared by a similar procedure as Example 11 with the proportions and individual monomers given in Tables I and II.

As demonstrated by the test results shown in Table III, the novel fluorinated polymer compositions of the present invention provide excellent oil-repellent properties, and good water repellent properties for substantially all of the fabrics 1 to 8 identified in Table IV, which oil-repellency results of less than 4 only on fabric 7 with the composition of Example 20. Excellent oil-and water-repellency were obtained by the use of nearly all of the compositions on wood, as shown by Table III.

The compositions of the examples 1 to 17 and 20–22 were tested on leathers 1 to 7 identified in Table IV to determine the oil-and water-repellent properties imparted thereby, with the results shown in Table III.

Table III also shows the test results using comparative compositions of Examples 27 and 28, which do not include the third polymer component of the novel compositions of the present invention. The oil-and water-repellency imparted to the fabrics and leathers identified in Table IV demonstrated oil-repellency values less than 4 in most cases, water-repellency values other than 50/50 in many cases and overall combined values which were generally substantially inferior to the protection against oil and water afforded by the novel compositions of the present invention.

TABLE 1

| | | Component (1) |
|---|---|---|
| 1. | A. | $R_fCH_2CH_2OC(O)CHCH_2$ (Rf = $C_8F_{17}$ to $C_{12}F_{25}$) |
| | B. | $C_8F_{17}CH_2CH_2OC(O)CHCH_2$ |
| | C. | $C_8F_{17}CH_2CH_2OC(O)CCH_3CH_2$ |
| | D. | $C_8F_{17}SO_2N(C_2H_5)CH_2CH_2OC(O)CHCH_2$ |
| | E. | $R_fCH_2CH_2C(O)CCH_3CH_2$ (Rf = $C_8F_{13}$ to $C_{12}F_{25}$) |
| | F. | $C_8F_{17}SO_2N(C_2H_5)CH_2CH_2OC(O)CCH_3CH_2$ |
| | | Component (2) |
| 2. | A. | $C_{18}H_{37}OC(O)CCH_3CH_2$ |
| | B. | $C_{12}H_{25}OC(O)CCH_3CH_2$ |
| | C. | $C_{10}H_{21}OC(O)CCH_3CH_2$ |
| | D. | $C_8H_{17}OC(O)CCH_3CH_2$ |
| | E. | $C_{10}H_{17}OC(O)CHCH_2$ |
| | | Component (3) |
| 3. | A. | $CH_3OC(O)(OCH_3)CHNHC(O)CHCH_2$ |
| | B. | $CH_3C(O)CH_2C(O)OCH_2CH_2OC(O)CCH_3CH_2$ |
| | C. | $ClCH_2(HO)CHCH_2OC(O)CCH_3CH_2$ |

TABLE II

| Example No. | Component (1) | | Component (2) | | Component (3) | |
|---|---|---|---|---|---|---|
| | WT. | % | WT. | % | WT. | % |
| 1 | 1A | 50% | 2A | 35% | 3A | 15% |
| 2 | 1C | 50% | 2B | 35% | 3A | 15% |
| 3 | 1A | 50% | 2B | 35% | 3A | 15% |
| 4 | 1A | 50% | 2C | 35% | 3A | 15% |
| 5 | 1A | 50% | 2D | 35% | 3A | 15% |
| 6 | 1E | 50% | 2B | 35% | 3A | 15% |
| 7 | 1D | 50% | 2B | 35% | 3A | 15% |
| 8 | 1B | 50% | 2B | 35% | 3A | 15% |
| 9 | 1C | 50% | 2B | 35% | 3A | 15% |
| 10 | 1F | 50% | 2B | 35% | 3A | 15% |
| 11 | 1A | 50% | 2A | 35% | 3B | 15% |
| 12 | 1A | 50% | 2C | 35% | 3B | 15% |
| 13 | 1A | 50% | 2B | 35% | 3B | 15% |
| 14 | 1D | 50% | 2B | 35% | 3B | 15% |
| 15 | 1E | 50% | 2B | 35% | 3B | 15% |
| 16 | 1C | 50% | 2B | 35% | 3B | 15% |
| 17 | 1B | 50% | 2B | 35% | 3B | 15% |
| 18 | 1A | 50% | 2A 2E | 17.5% 17.5% | 3B | 15% |
| 19 | 1A | 50% | 2B | 30% | 3B | 20% |
| 20 | 1A | 50% | 2B | 40% | 3B | 10% |
| 21 | 1A | 50% | 2A 2E | 15% 20% | 3B | 15% |
| 22 | 1A | 50% | 2B | 30% | 3C | 20% |
| 23 | 1A | 50% | 2B | 30% | 3C | 20% |
| 24 | 1F | 50% | 2B | 35% | 3C | 15% |
| 25 | 1B | 50% | 2B | 35% | 3C | 15% |
| 26 | 1D | 50% | 2B | 35% | 3C | 15% |
| 27 | 1A | 50% | 2A | 50% | 0 | |
| 28 | 1A | 50% | 2B | 50% | 0 | |

TABLE III

| Example No. | Fabric # 1 Oil H₂O/IPA | 2 | 3 | 4 | 5 | 6 | 7 | 8 | Leather # 1 Oil H₂O/IPA | 2 | 3 | 4 | 5 | 6 | 7 | Wood Oil H₂O/IPA |
|---|---|---|---|---|---|---|---|---|---|---|---|---|---|---|---|---|
| 1 | 6 50/50 | 6 | 6 | 6 | 6 | 6 | 5 | 6 | 4 70/30 | 6 70/30 | 3 70/30 | 5 50/50 | 5 70/30 | 5 70/30 | 5 70/30 | 7 50/50 |
| 2 | 5 | 5 | ↑ 6 | ↑ 6 | ↑ 5 | ↑ 5 | ↑ 5 | ↑ 6 | 4.5 | 5.5 | 4 | 5 50/50 | ↑ 5 | ↑ 4.5 | ↑ 3.5 | 7 |
| 3 | 6 50/50 | ↑ 6 | ↑ 6 | ↑ 7 | ↑ 6 | 6.5 | 6 70/30 | 80/20 50/50 | 4 70/30 | 50/50 6 | 70/30 3 | 70/30 4 | 70/30 4 | 80/20 4 | 80/20 3 | 50/50 7 |
| 4 | 6 50/50 | ↑ 6 | ↑ 6 | ↑ 6 | ↑ 6 | ↑ 5 | ↑ 4 | 50/50 5 | 5 50/50 | 6 50/50 | 3 70/30 | 4 50/50 | 4 70/30 | 3 70/30 | 3 50/50 | 50/50 6.5 |
| 5 | 5 80/20 | 50/50 5 | ↑ 5 | ↑ 6 | 70/30 5 | 70/30 5 | 70/30 4 | 90/10 5 | 2 70/30 | 4 70/30 | ↑ 1 | 4 70/30 | 2 70/30 | 3 70/30 | 3 70/30 | 3 50/50 |
| 6 | 5 90/10 | 50/50 6 | 5.5 ↑ | ↑ 6 | ↑ 5 | 70/30 5 | 80/20 4 | 80/20 6 | 0 | 100/0 2 | 80/20 0 | 80/20 4 | 90/10 1 | 70/30 2 | 30/70 2 | 6 50/50 |
| 7 | 6 50/50 | ↑ 6 | ↑ 6 | ↑ 6 | ↑ 6 | ↑ 6 | ↑ 5 | ↑ 6 | 4 | 100/0 6 | 4.5 ↑ | ↑ 3 | 6 90/10 | ↑ 4 | ↑ 5 | ↑ 6.5 |
| 8 | 6 70/30 | ↑ 6 | ↑ 6 | ↑ 6 | ↑ 5 | ↑ 6 | ↑ 5 | ↑ 6 | 3 50/50 | 5 70/30 | 3 80/20 | 3 70/30 | 5 80/20 | 3 80/20 | 3 50/50 | 6.5 50/50 |
| 9 | 6 70/30 | ↑ 6 | ↑ 6 | ↑ 6 | 80/20 6 | ↑ 4 | 80/20 4 | ↑ 6 | 3.5 80/20 | 6 70/30 | 3 80/20 | 4 70/30 | 5 80/20 | 4 80/20 | 3 70/30 | 6.5 50/50 |
| 10 | 4 90/10 | 70/30 4 | 4 | 50/50 6 | ↑ 4 | ↑ 4 | 80/20 4.5 | 90/10 5 | 4 | 4 70/30 | 2 80/20 | 2 70/30 | 3 70/30 | 3 80/20 | 3 80/20 | 6 50/50 |
| 11 | 5 50/50 | ↑ 6 | ↑ 6 | ↑ 6 | ↑ 6 | ↑ 4 | ↑ 5 | 70/30 5 | 4 70/30 | 6 70/30 | 3 80/20 | 2 70/30 | 3 80/20 | 4 50/50 | 4 70/30 | 5 50/50 |
| 12 | 5 50/50 | ↑ 5 | ↑ 5 | ↑ 4 | ↑ 4 | ↑ 4 | 100/0 4 | 50/50 5 | 0 80/20 | 0/100 1 | 80/20 2 | 50/50 3 | 70/30 3 | 70/30 3 | 30/70 2 | 5 50/50 |
| 13 | 5 50/50 | ↑ 7 | ↑ 7 | ↑ 8 | 6.5 | 5.5 | 70/30 4 | 50/50 5 | 5 10/90 | 6 0/100 | 5 10/90 | 6 0/100 | 6 ↑ | 6 ↑ | 6 ↑ | 5 20/80 |
| 14 | 8 50/50 | ↑ 6 | ↑ 6 | ↑ 6 | ↑ 6 | ↑ 6 | ↑ 6 | ↑ 6 | 2 70/30 | 4 70/30 | 2 80/20 | 5 70/30 | 4 40/60 | 2 20/80 | 3 70/30 | 6 50/50 |
| 15 | 6 50/50 | ↑ 6 | ↑ 6 | ↑ 7 | ↑ 6 | ↑ 6 | ↑ 5 | ↑ 5 | 2 70/30 | 6 70/30 | 5 80/20 | 5 10/90 | 5 10/90 | 6 20/80 | 6 70/30 | 5 30/70 |
| 16 | 6 50/50 | ↑ 7 | ↑ 7 | ↑ 7 | ↑ 7 | ↑ 7 | ↑ 7 | ↑ 7 | 2 70/30 | IPA 6 | 5 80/30 | 5 10/90 | 6 10/90 | 6 0/100 | 6 0/100 | 6 50/50 |
| 17 | 5 50/50 | ↑ 6 | ↑ 6 | ↑ 8 | ↑ 6 | ↑ 6 | ↑ 6 | ↑ 6 | 2 70/30 | 6 10/90 | 5 20/80 | 3 0/100 | 1 20/80 | 4 0/100 | 3 0/100 | 6 50/50 |
| 18 | 6 50/50 | ↑ 6 | ↑ 6 | ↑ 7 | ↑ 6 | ↑ 5 | ↑ 5 | ↑ 5 | 1 80/20 | 3 30/70 | 1 70/30 | 3 0/100 | 6 80/20 | 4 10/90 | 3 20/80 | 6.5 50/50 |
| 19 | 7 50/50 | ↑ 7 | ↑ 7 | ↑ 7 | 30/70 7 | 30/70 7 | 30/70 5.5 | 40/60 6 | | | | | | | | 6 50/50 |
| 20 | 5 50/50 | 30/70 7 | 30/70 7 | 20/80 6 | 7 | 30/70 6.5 | 5.5 ↑ | ↑ 4 | 3 40/60 | 4 20/80 | 2 70/30 | 3 10/90 | 3 70/30 | 2 20/80 | 3 10/90 | 4 30/70 |
| 21 | 6 50/50 | — | 30/70 4 | ↑ | ↑ | ↑ | ↑ | ↑ | 4 50/50 | 2 ↑ | 3 ↑ | 2 70/30 | 3 50/50 | 4 | 4 | 6 |
| 22 | 7 30/70 | 7 | 7 | 7 | 7 | 7 | 7 | 7 | 7 20/80 | 7 | 4 | 5 70/30 | 5 70/30 | 5 70/30 | 5 70/30 | 50/50 6.5 |
| 23 | 6 30/70 | 30/70 6 | 30/70 4 | ↑ | ↑ | ↑ | ↑ | 4 | 1 | 3 10/90 | 5 20/80 | 3 0/100 | 6 20/80 | 5 0/100 | 3 0/100 | 30/70 5.5 |
| 24 | 3.5 | 40/60 4.5 | ↑ 4.5 | 5.5 | ↑ | ↑ | 4.5 | | | | | | | | 20/80 | 6 30/70 |
| 25 | 5 50/50 | 4.5 | 4.5 | 5.5 | 5 | 5 | 4.5 | 5 | 7 80/20 | 3 30/70 | 4 50/50 | 5 70/30 | 5 70/30 | 5 40/60 | 5 40/60 | 30/70 |

TABLE III-continued

| | Fabric # 1 Oil H₂O/IPA | 2 | 3 | 4 | 5 | 6 | 7 | 8 | Leather # 1 Oil H₂O/IPA | 2 | 3 | 4 | 5 | 6 | 7 | Wood Oil H₂O/IPA |
|---|---|---|---|---|---|---|---|---|---|---|---|---|---|---|---|---|
| Example No. | | | | | | | | | | | | | | | | |
| 26 | 60/40 5 | 50/50 5 | 50/50 5 | 50/50 5.5 | 60/40 5 | 40/60 5 | 40/60 4 | 40/60 4.5 | | | | | | | | |
| 27 | 60/40 1 | 50/50 4 | 50/50 5 | 50/50 6 | 50/50 4 | 50/50 4 | 70/30 1 | 70/30 3 | 80/20 1 | 0 → | 1 → | 0 90/10 | 1 90/10 | 1 80/20 | 0 90/10 | 6 50/50 |
| 28 | 50/50 0 | → 2 | → 2 | → 5 | → 2 | → 2 | 100/0 0 | 0 0 | | | | | | | | |

TABLE IV

| Number | Fabric Description (Upholstery) |
|---|---|
| | Composition |
| 1 | Merrimac M901 Lisere Rose |
| | 40% Rayon |
| | 30% Acetate |
| | 30% Polyester |
| 2 | Sun Spalding 7404 |
| | 64% Rayon |
| | 36% Polyester |
| 3 | Sun Zorina 7401 |
| | 64% Cotton |
| | 36% Polyester |
| 4 | Test Fabrics |
| | 100% Nylon Taffeta |
| 5 | Valdese Weavers 327-7633 |
| | 57% Cotton |
| | 43% Rayon |
| 6 | Sun Keats 2417 |
| | 100% Cotton |
| 7 | Merrimac M881 - Rose |
| | 66% Polyester |
| | 18% Acrylic |
| | 16% Cotton |
| 8 | Sun Hamlet 2601 |
| | 100% Rayon |

| Wood Sample white birch Board | Leather Description |
|---|---|
| 1 | Doe Kid 9277 (Naked Finish) |
| 2 | Lamb Skin Suede 9236 |
| 3 | Pig Suede 9278 |
| 4 | Top Grain Chrom Tanned Cowhide |
| 5 | Suede Split 9272 |
| 6 | Top Grain Chrom Tanned Cowhide |
| 7 | Light Weight Top Grain Chap Cowhide Chrom Tanned |

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A hydrocarbon-soluble fluorinated terpolymer comprising the polymerization product of monomers comprising:
   (a) a fluorinated vinyl monomer containing at least one perfluoroaliphatic radical terminating in a CF3 group and containing at least 25 percent by weight of its fluorine in the form of fluoroapliphatic radical;
   (b) a higher aliphatic hydrocarbyl vinyl monomer containing a higher aliphatic hydrocarbyl group having from 8 to 20 carbon atoms, and
   (c) a polyfunctional vinyl monomer selected from the group consisting of (1) a vinyl amido glycolate ether (2) a vinyl diketo ester and (3) a vinyl ester compound having the formula:

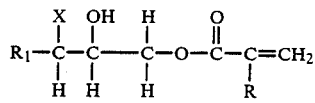

wherein $R_1$ is hydrogen or a lower alkyl group having 1 to 4 carbon atoms, preferably hydrogen, X is a halogen atom, preferably chlorine, and R is H or $CH_3$,
said polymerization product being sufficiently soluble in odorless mineral spirits solvent for the application of odorless mineral spirit solutions containing effective amounts thereof to a variety of materials to substantially improve the oil-and water-resistance of such materials upon curing of said terpolymer.

2. A terpolymer according to claim 1 comprising the polymerization product of a perfluoroaliphatic(meth)acrylic acid ester, a saturated fatty acid (meth)acrylic acid ester and a (meth)acrylic monomer selected from the group consisting of (1) (meth)acrylamido glycolate ethers, (2) aceto acetoxy alkyl(meth)acrylates and (3) halo hydroxy alkyl(meth)acrylates.

3. A terpolymer according to claim 2 comprising the polymerization prodcut of (a) about 40 to 60% by weight of perfluoroalkylethyl(meth)acrylate, (b) about 20 to 50% by weight of stearyl(meth)acrylate and (c) about 5 to 30% by weight of an (meth)acrylic monomer selected from the group consisting of (1) (meth)acrylamido glycolate methyl ether, (2) acetoacetoxy ethyl(meth)acrylate and (3) chloro-2-hydroxy propyl(meth)acrylate.

4. A terpolymer according to claim 3 comprising about 50% by weight of monomer (a), about 25 to 40% by weight of monomer (b) and about 15 to 25% by weight of monomer (c).

5. A terpolymer according to claim 3 comprising the polymerization product of (a), (b) and (c)(1).

6. A terpolymer according to claim 3 comprising the polymerization product of (a), (b) and (c)(2).

7. A terpolymer according to claim 3 comprising the polymerization product of (a), (b) and (c)(3).

8. A composition for treating materials to render the surfaces thereof more resistant to penetration by oil and/or water, comprising a solution of a terpolymer as defined in claim 1 in a volatile organic solvent in a concentration of between about 0.5% and 5% by weight.

9. A composition according to claim 8 in which said solvent comprises odorless mineral spirits.

* * * * *

UNITED STATES PATENT AND TRADEMARK OFFICE
CERTIFICATE OF CORRECTION

PATENT NO. : 4,791,166

DATED : December 13, 1988

INVENTOR(S) : John C. Saukaitis

It is certified that error appears in the above-identified patent and that said Letters Patent is hereby corrected as shown below:

Column 2, line 11:

The word "methyl" should be added after the word "glycolate" and before the word "ether" on line 12.

Column 14, line 27:

The word "prodcut" should read "product".

Column 14, line 47:

The word "resistanct" should read "resistant".

Signed and Sealed this

Twelfth Day of December, 1989

Attest:

JEFFREY M. SAMUELS

*Attesting Officer*    *Acting Commissioner of Patents and Trademarks*